(12) United States Patent
Ito et al.

(10) Patent No.: US 8,782,669 B2
(45) Date of Patent: Jul. 15, 2014

(54) NON-TRANSITORY STORAGE MEDIUM ENCODED WITH COMPUTER READABLE INFORMATION PROCESSING PROGRAM CAPABLE OF ENHANCING ZEST OF APPLICATION PROGRAM PERFORMING EVENT PROCESSING, INFORMATION PROCESSING APPARATUS, METHOD OF CONTROLLING INFORMATION PROCESSING APPARATUS, AND INFORMATION PROCESSING SYSTEM

(75) Inventors: Yuichiro Ito, Kyoto (JP); Kouichi Kawamoto, Kyoto (JP); Toshikazu Jin, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 74 days.

(21) Appl. No.: 13/555,763

(22) Filed: Jul. 23, 2012

(65) Prior Publication Data

US 2013/0312013 A1    Nov. 21, 2013

(30) Foreign Application Priority Data

May 15, 2012    (JP) .................................. 2012-111418

(51) Int. Cl.
*G06F 9/44*     (2006.01)
*G06F 17/00*    (2006.01)

(52) U.S. Cl.
USPC ............................................. 719/318; 463/1

(58) Field of Classification Search
USPC ............................................. 719/318; 463/1
See application file for complete search history.

(56) References Cited

U.S. PATENT DOCUMENTS

| 2010/0325235 | A1 | 12/2010 | Konno et al. | |
|---|---|---|---|---|
| 2011/0060825 | A1* | 3/2011 | Ooe et al. | 709/224 |
| 2011/0237400 | A1* | 9/2011 | King et al. | 482/8 |
| 2013/0005489 | A1* | 1/2013 | Santhosh | 463/43 |

FOREIGN PATENT DOCUMENTS

JP    2011-000309    1/2011

* cited by examiner

*Primary Examiner* — Charles E Anya
(74) *Attorney, Agent, or Firm* — Nixon & Vanderhye, P.C.

(57) ABSTRACT

An exemplary embodiment provides a non-transitory storage medium encoded with a computer readable information processing program and executable by a computer of an information processing apparatus. The information processing program causes the computer to function as a data storage unit for storing for each user, data for application that can be made use of in a prescribed application program executable by a plurality of users, a data communication unit for transmitting and receiving the data for application stored in the data storage unit to and from another unspecified information processing apparatus present within a prescribed range, and an event processing unit for performing event processing based on at least one of the data for application received by the data communication unit and the data for application of another user stored in the data storage unit when one of the plurality of users executes the prescribed application program.

17 Claims, 11 Drawing Sheets

| 2 | USER A | |
|---|---|---|
| | LEVEL | LV4 |
| | COMMENTS | FUN |
| | UPDATE FLAG | OFF (USER B) |
| | THE NUMBER OF TIMES OF EXECUTION | 1 |
| | USER B | |
| | LEVEL | LV2 |
| | COMMENTS | NEITHER GOOD NOR BAD |
| | UPDATE FLAG | ON (USER A) |
| | THE NUMBER OF TIMES OF EXECUTION | 2 |

211 (User A block), 212 (User B block)

NON-TRANSITORY STORAGE MEDIUM ENCODED WITH COMPUTER READABLE INFORMATION PROCESSING PROGRAM CAPABLE OF ENHANCING ZEST OF APPLICATION PROGRAM PERFORMING EVENT PROCESSING, INFORMATION PROCESSING APPARATUS, METHOD OF CONTROLLING INFORMATION PROCESSING APPARATUS, AND INFORMATION PROCESSING SYSTEM

This nonprovisional application is based on Japanese Patent Application No. 2012-111418 filed with the Japan Patent Office on May 15, 2012, the entire contents of which are hereby incorporated by reference.

FIELD

The present disclosure relates to a non-transitory storage medium encoded with a computer readable information processing program, an information processing apparatus, a method of controlling an information processing apparatus, and an information processing system.

BACKGROUND AND SUMMARY

A system capable of providing data that can be made use of in an application to another information processing apparatus through near field wireless communication has conventionally been known.

In the system above, data that can be made use of in an application is exchanged only with a communication counterpart through near field wireless communication and an opportunity for event processing where the data is made use of has been limited.

The present invention was made in order to solve the problems as above, and an object thereof is to provide a non-transitory storage medium encoded with a computer readable information processing program capable of enhancing zest of an application program performing event processing, an information processing apparatus, a method of controlling an info' nation processing apparatus, and an information processing system.

An exemplary embodiment provides a non-transitory storage medium encoded with a computer readable information processing program and executable by a computer of an information processing apparatus. The information processing program causes the computer of the information processing apparatus to function as a data storage unit for storing for each user, data for application that can be made use of in a prescribed application program executable by a plurality of users, a data communication unit for transmitting and receiving the data for application stored in the data storage unit to and from another unspecified information processing apparatus present within a prescribed range, and an event processing unit for performing event processing based on at least one of the data for application received by the data communication unit and the data for application of another user among the plurality of users stored in the data storage unit when one of the plurality of users executes the prescribed application program.

In an exemplary embodiment, the event processing unit may perform first event processing based on the data for application received by the data communication unit and second event processing based on the data for application of another user stored in the data storage unit.

In an exemplary embodiment, the first event processing and the second event processing may be the same event processing.

In an exemplary embodiment, the event processing unit may perform the second event processing based on the data for application of another user stored in the data storage unit even when the data communication unit has not received the data for application.

In an exemplary embodiment, the event processing unit may perform the second event processing when the data for application of another user stored in the data storage unit satisfies a prescribed condition.

In an exemplary embodiment, the prescribed condition may refer to a case where at least a part of the data for application of another user that was used when the second event processing was previously performed is updated.

In an exemplary embodiment, the data for application of another user used for the event processing may be data internally updated when another user executes the prescribed application program.

In an exemplary embodiment, the prescribed application program may be an application program for performing training processing promoting improvement in physical ability.

In an exemplary embodiment, the data for application may be data representing progress of a user in connection with the training processing.

The event processing unit may include a determination unit for performing winner determination processing based on comparison between data for application of the user himself/herself and at least one of the received data for application and the data for application of another user.

In an exemplary embodiment, the data storage unit may store the data for application in response to a user's input each time the user executes the prescribed application program a prescribed number of times.

In an exemplary embodiment, the data communication unit may transmit the data for application of the plurality of users to another information processing apparatus in a batch.

An exemplary embodiment provides a method of controlling an information processing apparatus. The method of controlling an information processing apparatus includes a data storage step of storing for each user, data for application that can be made use of in a prescribed application program executable by a plurality of users, a data communication step of transmitting and receiving the data for application stored in the data storage step to and from another unspecified information processing apparatus present within a prescribed range, and an event processing step of performing event processing based on at least one of the data for application received in the data communication step and the data for application of another user among the plurality of users stored in the data storage step when one of the plurality of users executes the prescribed application program.

An exemplary embodiment provides an information processing apparatus. The information processing apparatus includes a data storage unit for storing for each user, data for application that can be made use of in a prescribed application program executable by a plurality of users, a data communication unit for transmitting and receiving the data for application stored in the data storage unit to and from another unspecified information processing apparatus present within a prescribed range, and an event processing unit for performing event processing based on at least one of the data for application received by the data communication unit and the data for application of another user among the plurality of users stored in the data storage unit when one of the plurality of users executes the prescribed application program.

An exemplary embodiment provides an information processing system. The information processing system includes a data storage unit for storing for each user, data for application that can be made use of in a prescribed application program executable by a plurality of users, a data communication unit for transmitting and receiving the data for application stored in the data storage unit to and from another unspecified information processing apparatus present within a prescribed range, and an event processing unit for performing event processing based on at least one of the data for application received by the data communication unit and the data for application of another user among the plurality of users stored in the data storage unit when one of the plurality of users executes the prescribed application program.

According to the exemplary embodiment, zest of an application program performing event processing can be enhanced.

The foregoing and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

Some embodiments will be described in detail with reference to the drawings. The same or corresponding elements in the drawings have the same reference characters allotted and description thereof will not be repeated.

In the present example, a portable game device will be described as one example of an information processing apparatus.

<Configuration of Portable Game Device>

Figure 1:
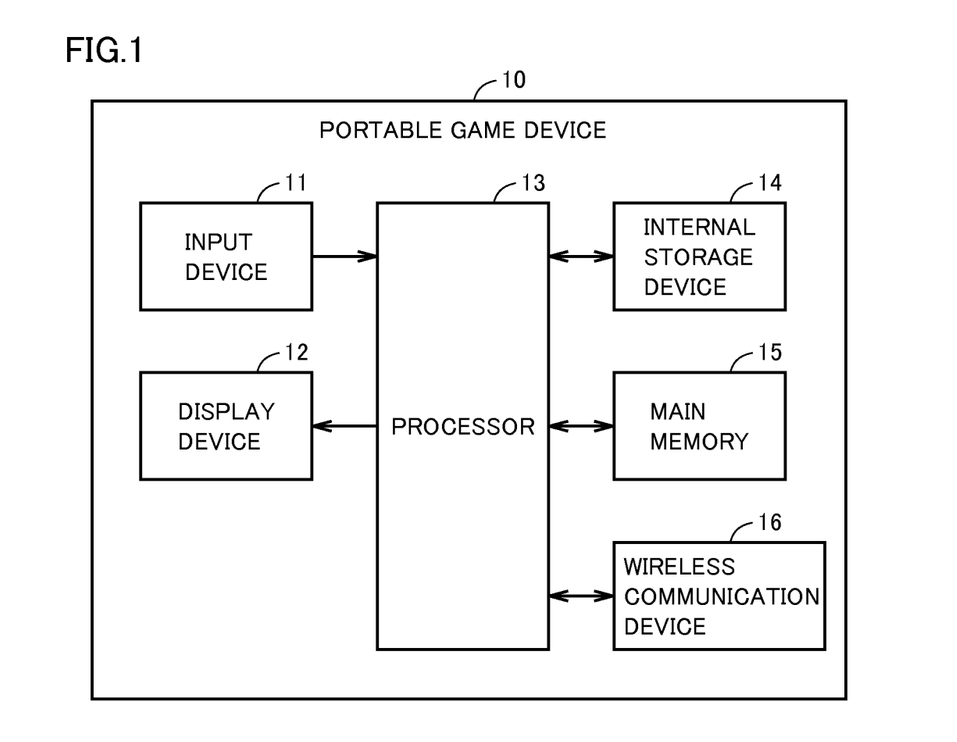
FIG. 1 shows an exemplary illustrative non-limiting schematic block diagram of a configuration of a portable game device 10 according to an exemplary embodiment.

FIG. 1 is a schematic block diagram of a configuration of a portable game device 10 according to the present embodiment. Since the configuration is also the same in other portable game devices, detailed description thereof will not be provided.

Referring to FIG. 1, portable game device 10 includes an input device 11, a display device 12, a processor 13, an internal storage device 14, a main memory 15, and a wireless communication device 16.

Input device 11 is operated by a user of portable game device 10 and it outputs a signal in response to a user's operation to processor 13. Input device 11 is implemented, for example, by a cross-shaped switch, a push button, or a touch pad.

Display device 12 displays an image generated by portable game device 10 on a screen. A liquid crystal display (LCD) can be employed as display device 12 by way of example.

Processor 13 is an operation processing unit for executing a computer program.

Internal storage device 14 stores a computer program executed by processor 13. In addition, internal storage device 14 also stores data to be exchanged through near field communication for exchange which will be described later. A NAND-type flash memory can be employed as internal storage device 14 by way of example. It is noted that a computer program executed by processor 13 may be recorded in advance or may be obtained from another device through communication with another device.

Main memory 15 temporarily stores a computer program or information. A PSRAM (Pseudo-SRAM) can be employed as main memory 15 by way of example.

Wireless communication device 16 transmits and receives a signal to and from another portable game device through wireless communication.

<Outlines of Near Field Communication for Exchange>

Data communication between portable game devices according to the present embodiment will be described hereinafter.

In the present embodiment, portable game device 10 uses near field communication for exchange to be able to exchange data for application that can be made use of in a prescribed application program (hereinafter a prescribed game by way of example). Here, near field communication for exchange refers to such communication as repeatedly searching for another game device 10 present at a short distance, such as another unspecified portable game device 10 present within coverage of near field wireless communication, automatically transmitting prescribed data stored in internal storage device 14 (hereinafter exchange data) to another portable game device 10 found as a result of search, and automatically receiving from another portable game device 10 exchange data stored in internal storage device 14 of another portable game device 10. Near field communication for exchange is carried out, for example, when users carrying portable game devices 10 pass each other. In addition, the exchange data is created based on a user's operation or the like and stored in advance in a prescribed area of internal storage device 14.

A prescribed game is exemplified by a game in which training processing is performed in portable game device 10 for promoting improvement in physical ability, by way of example. For example, training processing effectively acting on a part of a human body is exemplified. Specifically, various types of processing such as brain training processing for improving memory or the like and eye training processing for improving dynamic vision or the like are exemplified.

The exchange data can include record data of results of training processing performed in a prescribed game by way of example. For example, data representing progress in the training processing is exemplified. Specifically, a stage (a level) of training, feedback on training, a period of training, and the like can be included.

In addition, in the present embodiment, a prescribed application program can be executed by each of a plurality of users in one game device 10 and the exchange data can store data of each user.

Moreover, in the present embodiment, it is in the case where data of the same game is stored in internal storage device 14 that communication for transmitting and receiving this exchange data is carried out.

Figure 2:
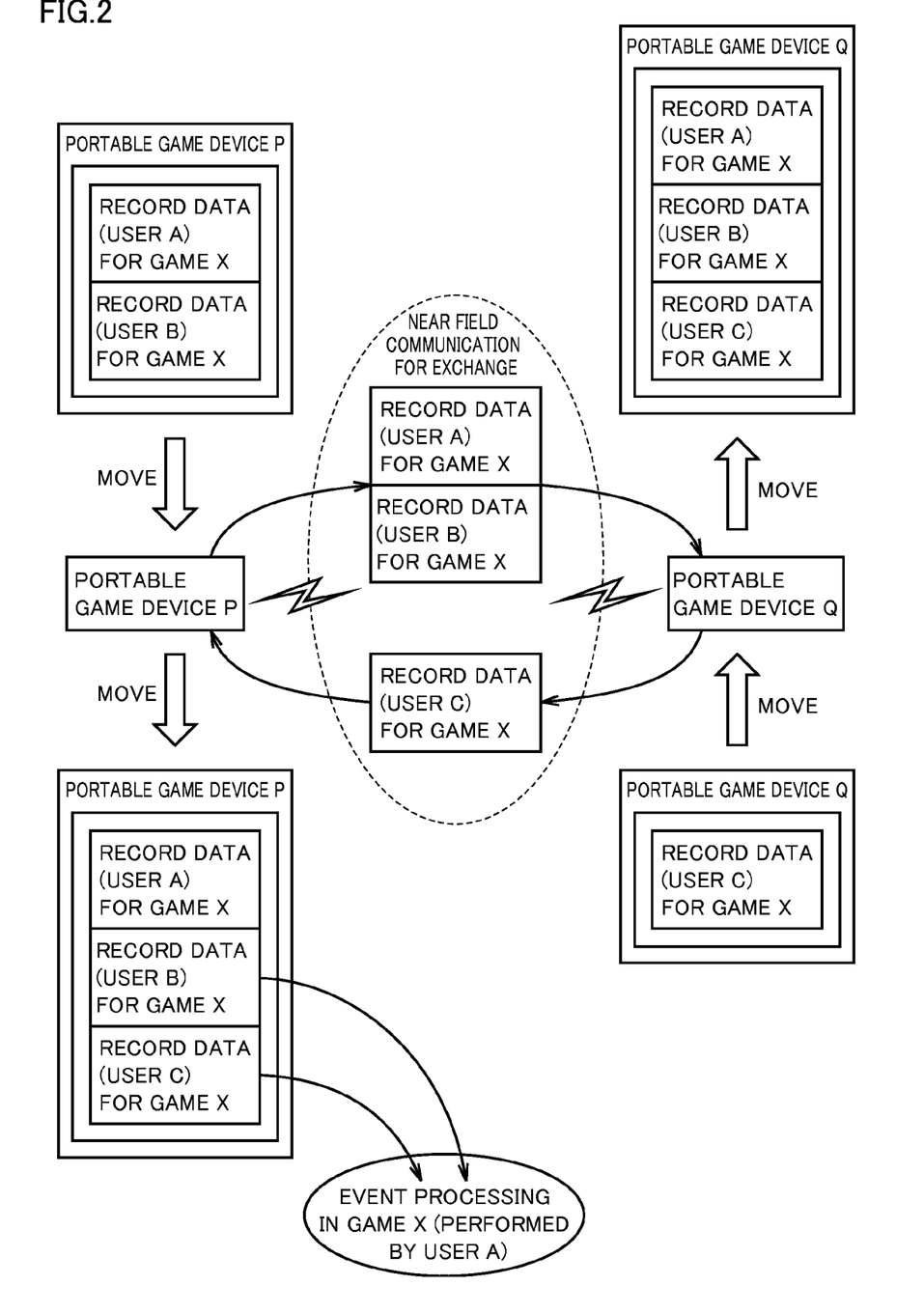
FIG. 2 shows an exemplary illustrative non-limiting diagram for illustrating a case where near field communication for exchange is carried out according to an exemplary embodiment.

FIG. 2 is a diagram for illustrating a case where near field communication for exchange according to the present embodiment is carried out.

Referring to FIG. 2, in the present example, a case where a user goes out with portable game device 10 is assumed by way of example.

Here, a portable game device P is made use of as a device shared by users A and B. In addition, a portable game device Q is made use of as a device possessed by a user C.

Then, a game X which is a prescribed application program can be executed by each of a plurality of users. When users A and B each execute game X in game device P, exchange data for game X (users A, B) is stored in internal storage device 14.

In addition, as a result of execution of game X by user C in game device Q, exchange data for game X (user C) is stored in internal storage device 14.

Then, as a result of near field communication for exchange at the time when game devices P and Q carried by the users pass each other, communication for transmitting and receiving their exchange data is carried out.

In the present example, communication for transmitting and receiving record data of users A and B included in the exchange data for game X and record data of user C included in the exchange data for game X between game devices P and Q is shown.

Thus, game device P will hold record data (user C) obtained from game device Q in addition to the record data (user A, user B) for game X.

On the other hand, game device Q will hold the record data (users A, B) for game X in addition to the record data (user C) for game X.

Then, when user A executes game X in game device P, event processing based on data of another user is performed in game device X.

Specifically, by way of example, in game device P, as a result of near field communication for exchange at the time of passing, event processing based on the record data (user C) for game X obtained from game device Q and event processing based on the record data (user B) for game X of user B making use of the same game device P are performed.

Therefore, event processing based on data of another user (for example, a family member) who shares the game device can be performed together with event processing based on data of another user obtained through near field communication for exchange at the time of passing.

By way of example of this event processing, for example, a character that appears immediately after start-up of game X giving self-introduction included in the record data of another user or providing comments on feedback or the like on game X, or the like is exemplified. In addition, playing based on the record data of another user and the record data of the user himself/herself in the game or the like is exemplified.

Figure 3:
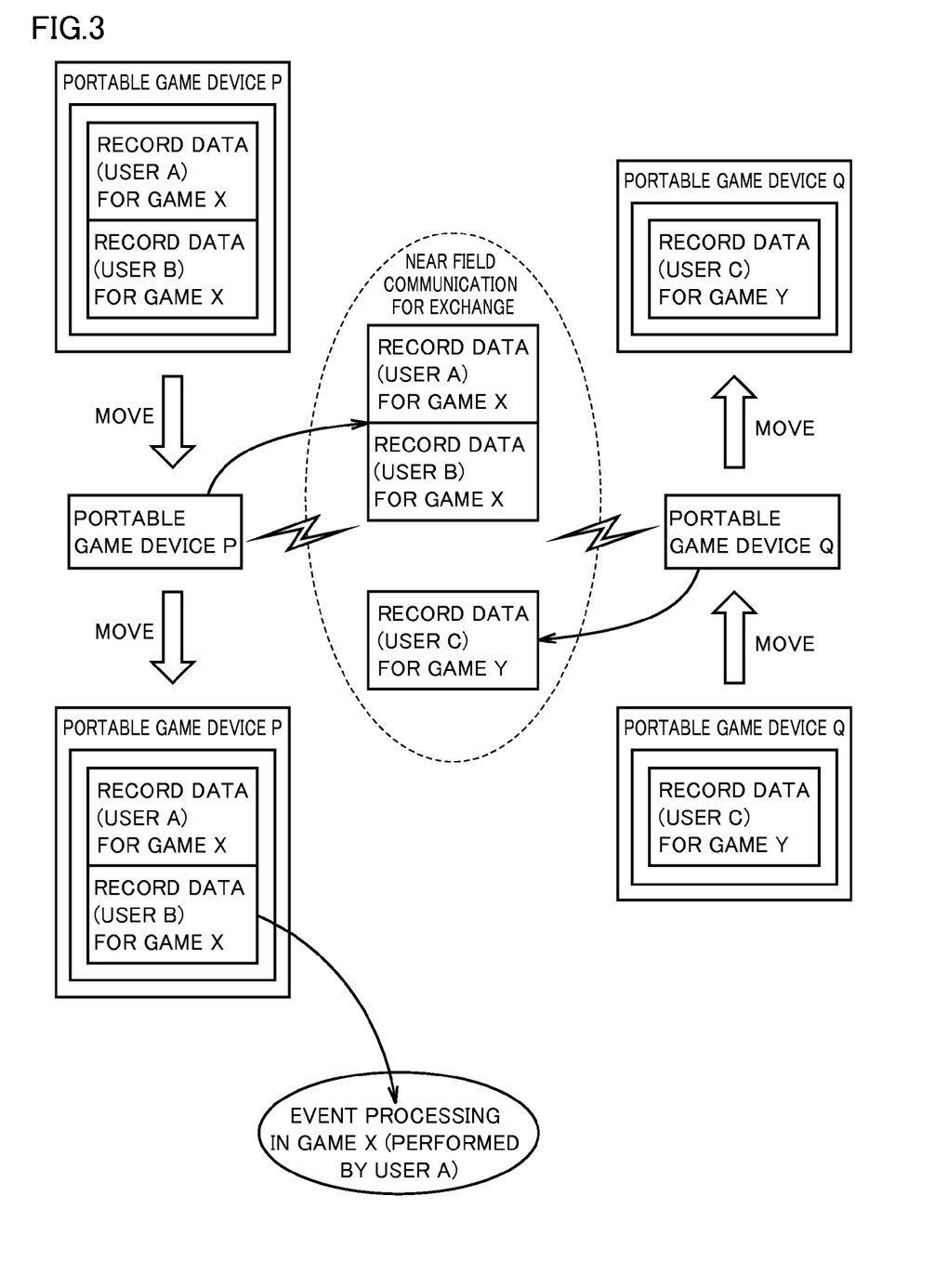
FIG. 3 shows an exemplary illustrative non-limiting diagram for illustrating a case where near field communication for exchange is not carried out according to an exemplary embodiment.

FIG. 3 is a diagram for illustrating a case where near field communication for exchange according to the present embodiment is not carried out.

Referring to FIG. 3, portable game device P is made use of as a device shared by users A and B. In addition, portable game device Q is made use of as a device possessed by user C.

Then, game X which is a prescribed application program can be executed by each of a plurality of users. As a result of execution of game X by each of users A and B in game device P, the exchange data (users A, B) for game X is stored in internal storage device 14.

On the other hand, as a result of execution of a game Y different from game X by user C in game device Q, exchange data (user C) for game Y is stored in internal storage device 14. Here, game device Q does not store exchange data for game X.

Then, when game devices P and Q carried by respective users pass each other, near field communication for exchange occurs, however, transmission and reception of record data included in the exchange data of game X or game Y is not carried out because the games are not the same. Namely, though near field communication for exchange occurs, game device P does not obtain record data from game device Q, which is also the case with game device Q.

In the present example, in the processing as well, when user A executes game X in game device P, event processing based on data of another user is performed in game X.

Specifically, by way of example, in game device P, as a result of near field communication for exchange at the time of passing, nothing was obtained from game device Q, but event processing based on the record data (user B) for game X of user B making use of the same game device P is performed.

Therefore, even in the case not obtaining data through near field communication for exchange at the time of passing, event processing based on data of another user (for example, a family member) who shares the game device can be performed. Namely, in any of the case of obtaining data through near field communication for exchange and the case not obtaining the data, event processing based on data of another user can be performed. Therefore, opportunities for event processing increase and zest of an application program can be enhanced.

Though the description will be given later, event processing based on the record data (user B) for game X of user B making use of the same game device P can be performed when a prescribed condition is satisfied. The prescribed condition is determined based on ON and OFF of an update flag. Though ON and OFF of the update flag will be described later, the update flag indicates that record data of another user has been updated by the fact that another user had executed game X representing the prescribed application program.

The event processing is an opportunity to come in pseudo contact with another user. As the opportunities increase, such fellow feeling as executing a prescribed application program can be enhanced and execution of the prescribed application program can continually be invited, which is useful in training processing of which continual use is desired.

Figure 4:
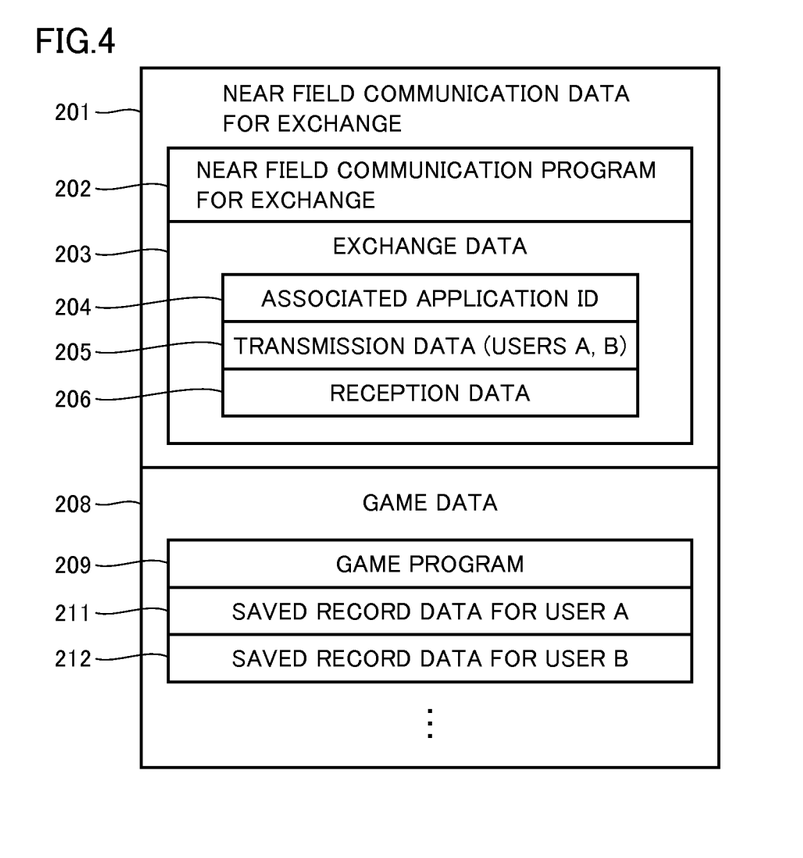
FIG. 4 shows an exemplary illustrative non-limiting diagram for illustrating one example of a program and information stored in a main memory 15 of portable game device 10 according to an exemplary embodiment.

FIG. 4 is a diagram for illustrating one example of a program and information stored in main memory 15 of portable game device 10 according to the present embodiment.

Referring to FIG. 4, near field communication data for exchange 201 includes a near field communication program for exchange 202 and exchange data 203.

Near field communication data for exchange 201 is loaded from internal storage device 14 to main memory 15 as necessary.

Near field communication program for exchange 202 is a program for carrying out near field communication for exchange.

Exchange data 203 is configured with an associated application ID 204 which is data representing a prescribed application program (game) associated with the data, transmission data 205 which is record data or the like to be transmitted through near field communication for exchange, and reception data 206 which is record data or the like received from another portable game device 10 through near field communication for exchange.

Exchange data 203 is set during exchange data setting processing which will be described later.

In addition, in the present example, transmission data 205 includes record data of users A and B.

Moreover, game data 208 includes a game program 209 for performing game processing and saved record data 211, 212 for each user. Game data 208 may be loaded from internal storage device 14 to main memory 15, may be read from an external storage device and loaded into main memory 15, or received from another portable game device 10 or a server device and loaded into main memory 15.

Game program 209 is a program for performing game processing as will be described later.

Saved record data 211 for user A and saved record data 212 for user B include record data or the like which is results of execution of a game by users A and B as a part of saved data of the game. It is noted that saved record data 211 for user A (saved record data 212 for user B) is created at the time when user A (user B) has registered prior to execution of a game, and it is used when user A (user B) executes the game.

Figure 5:
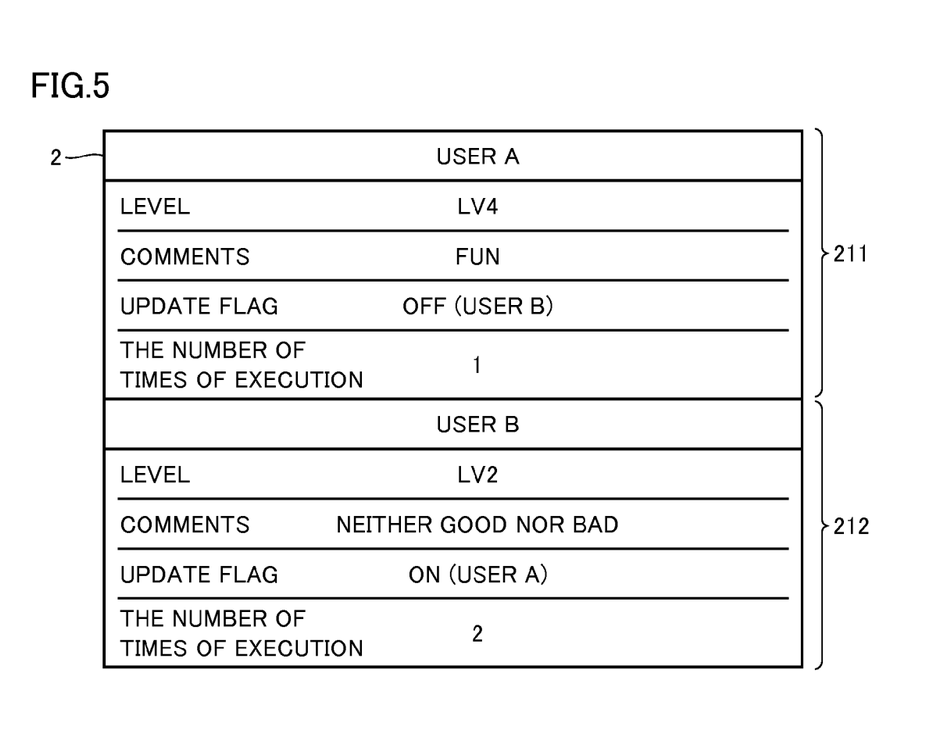
FIG. 5 shows an exemplary illustrative non-limiting diagram for illustrating saved record data for user according to an exemplary embodiment.

FIG. 5 is a diagram for illustrating saved record data for user according to the present embodiment.

Referring to FIG. 5, saved record data 211 for user A and saved record data 212 for user B are shown here.

Specifically, the saved record data for user includes information on a user name, a level, comments on a prescribed application program, an update flag, and the number of times of execution.

The level indicates a stage (a level) of game processing in accordance with a prescribed application program.

The update flag is a flag used for determining whether or not event processing based on data of another user (for example, a family member) has been performed, and the update flag is set to ON or OFF as necessary. Namely, when the update flag is ON, event processing based on data of another user is performed, and the update flag is set to OFF after event processing.

With regard to the update flag, specifically, information on ON/OFF is stored for each different user.

By way of example, in the present example, saved record data 211 for user A stores information on ON/OFF of the update flag for user B. Saved record data 212 for user B stores information on ON/OFF of the update flag for user A. If yet another user is present, an update flag for that another user is stored in each piece of saved record data for user.

The number of times of execution is the number of times of game processing performed. It is noted that the number of times of execution returns to an initial value when it is cleared.

Figure 6:
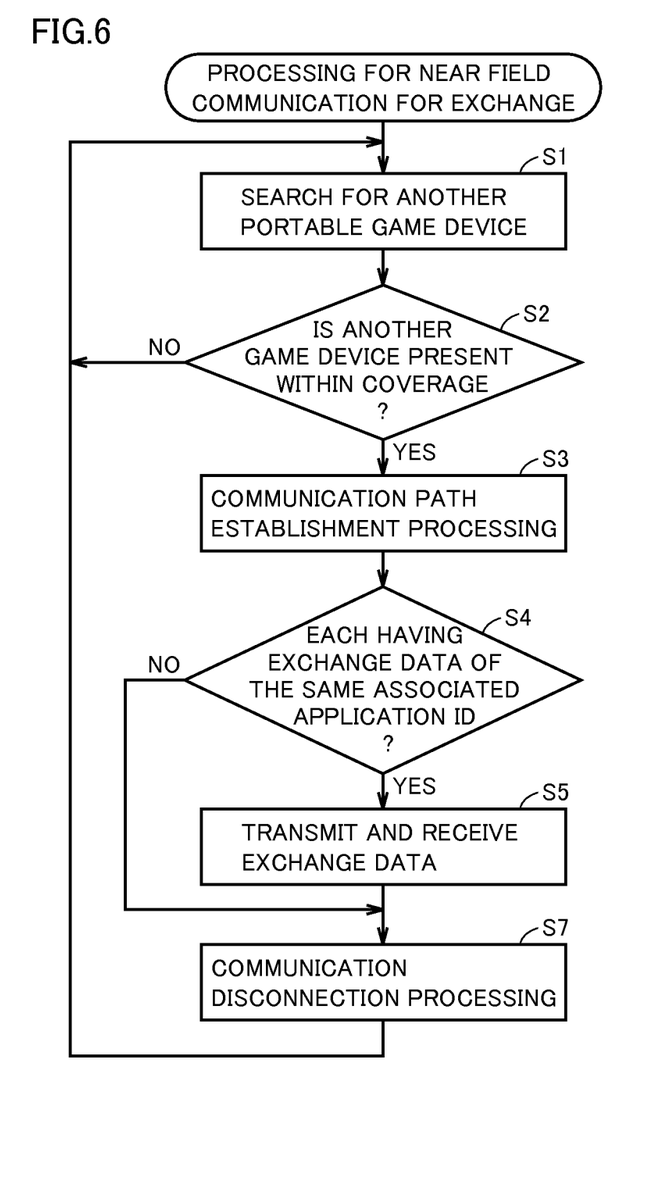
FIG. 6 shows an exemplary illustrative non-limiting flowchart for illustrating processing for near field communication for exchange according to an exemplary embodiment.

FIG. 6 is a flowchart for illustrating processing for near field communication for exchange according to the present embodiment.

Referring to FIG. 6, processing for near field communication for exchange is performed as processor 13, wireless communication device 16, and the like of portable game device 10 cooperate with one another. This processing is processing performed as background processing, for example, when portable game device 10 is in what is called a sleep state (which may also be referred to as a stand-by state or the like).

For example, during sleep, basically, wireless communication device 16 mainly operates, sleep of processor 13 is temporarily canceled as necessary, and such control that processor 13 temporarily becomes an executing entity is carried out (for example, processing for searching for another portable game device is performed in wireless communication device 16 and transmission and reception of data is carried out in processor 13, etc.). In addition, for example, a second processor operable with low power consumption may be provided separately from processor 13, and the second processor may serve as an executing entity during sleep. In addition, the present processing may be performed as appropriate in response to a user's instruction operation or the like unless a sleep state is set.

Initially, processing for searching for another portable game device 10 is performed (step S1). This is done, for example, as portable game device 10 repeats processing for transmitting a beacon indicating a connection request and processing for receiving this beacon.

Then, as a result of search above, whether or not another portable game device 10 is present within coverage is determined (step S2). For example, determination as YES is made when a signal responding to the transmitted beacon is received from another portable game device 10 within a prescribed period of time or when a beacon is received from another portable game device 10.

When it is determined in step S2 that another portable game device 10 is not present within coverage (NO in step S2), the process returns to step S1 and the processing is repeated.

On the other hand, when it is determined in step S2 that another portable game device 10 is present within coverage (YES in step S2), the processing for establishing a communication path for carrying out near field communication for exchange is performed (step S3).

Then, when the communication path is established, transmission and reception of associated application ID 204 is carried out and whether or not associated application ID 204 is the same is determined (step S4). Namely, whether or not exchange data 203 of the same game is prepared is determined.

When it is determined in step S4 that associated application ID 204 is the same (YES in step S4), processing for transmitting transmission data 205 and processing for receiving data sent from another portable game device as reception data 206 and storing that data are performed (step S5). Specifically, when the record data of users A and B is included as transmission data 205, processing for transmitting the record data in a batch is performed. Namely, for example, record data of family members is collectively transmitted. In addition, the record data of user C is received as reception data 206.

Then, processing for disconnecting near field communication for exchange is performed (step S7). Thereafter, the process returns to step S1 and the processing is repeated, for example, until the sleep state is canceled.

On the other hand, when it is determined that associated application ID 204 is not the same (NO in step S4), the processing in step S5 is skipped and the process proceeds to step S7, where processing for disconnecting near field communication for exchange is performed (step S7). Thereafter, the process returns to step S1 and the processing is repeated, for example, until the sleep state is canceled. Therefore, in the case where the game is not the same, transmission and reception using the exchange data is not carried out.

Figure 7:
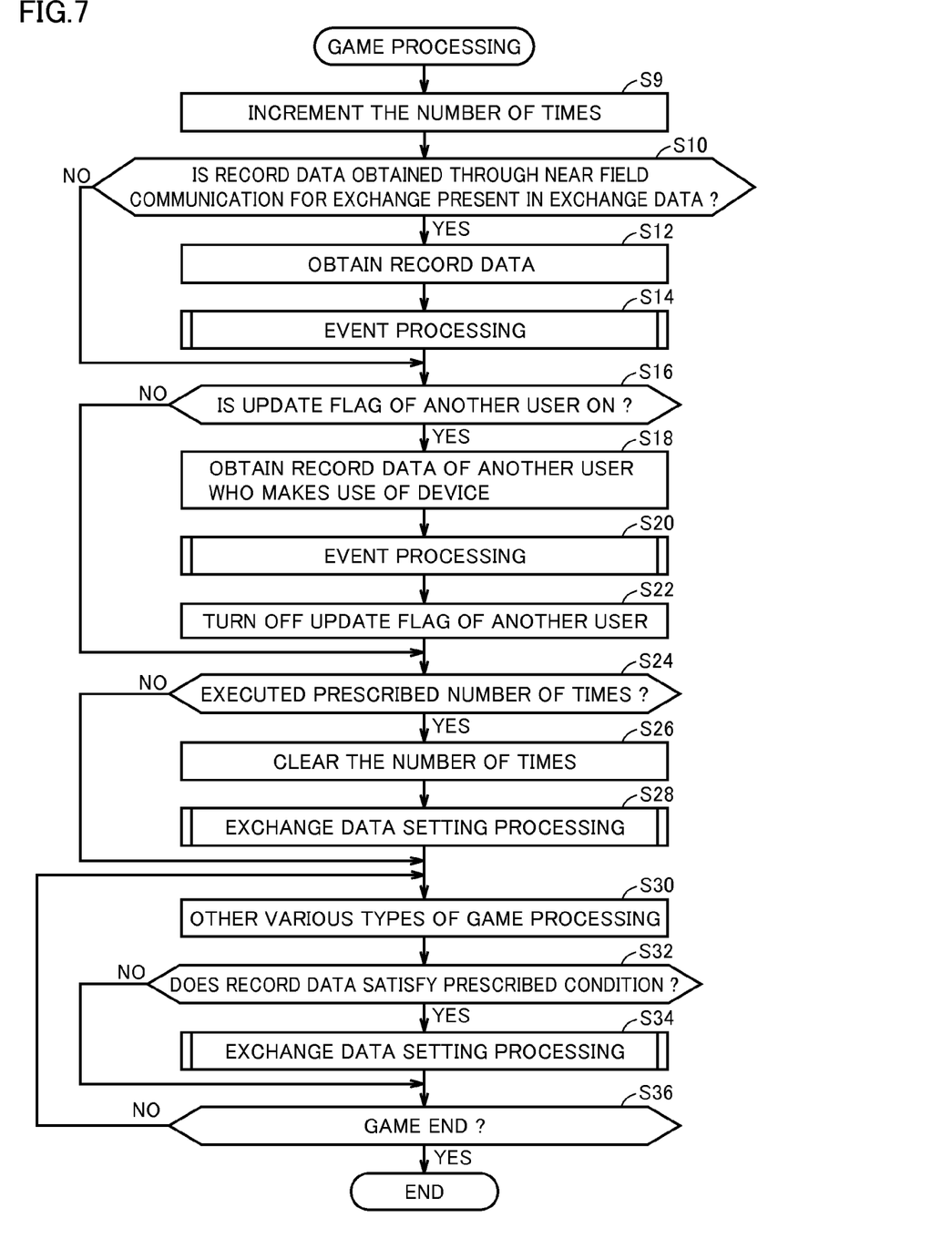
FIG. 7 shows an exemplary illustrative non-limiting flowchart for illustrating flow of game processing in portable game device 10 according to an exemplary embodiment.

FIG. 7 is a flowchart for illustrating flow of game processing in portable game device 10 according to the present embodiment.

Referring to FIG. 7, the game processing is performed by processor 13 of portable game device 10. In this game, for example, training processing for promoting improvement in physical ability is performed by way of example, and for example, brain training processing or the like in which questions such as quizzes and puzzles are given is exemplified. In the training processing, a plurality of levels are set based on degrees of difficulty, complexity, and the like of questions, and the user's level becomes higher as the user satisfies a prescribed condition in the training processing. It is noted that, if a prescribed condition is not satisfied, the user's level may be lowered.

Initially, when a specific user starts execution of game program 209, initially, the number of times of execution of game processing is incremented (step S9). The number of times of execution of game processing is used at the time of subsequent determination of the number of times of execution.

Then, reception data 206 of exchange data 203 is referred to, and whether or not record data obtained through near field communication for exchange is present in exchange data 203 is determined (step S10).

Then, when it is determined in step S10 that obtained record data is present in reception data 206 of exchange data 203 (YES in step S10), the record data is obtained (step S12).

Then, event processing based on the obtained record data is performed (step S14). The event processing will be described later. It is noted that, when the event processing is performed, the record data obtained from reception data 206 of exchange data 203 may be erased.

When there are a plurality of pieces of obtained record data in reception data 206, event processing in accordance with each piece of record data is performed.

Then, whether or not an update flag of another user stored in the saved record data for user is ON is determined (step S16). The update flag is provided for each different user and determination is made for each different user.

When it is determined in step S16 that the update flag of another user is ON (YES in step S16), record data of another user (for example, a family member) of which update flag is ON and who makes use of the device is obtained (step S18). By way of example, record data of another user (for example, a family member) of which update flag is ON, which is included in transmission data 205 of exchange data 203, is obtained.

Then, event processing based on the obtained record data is performed (step S20). The event processing is the same as event processing performed in step S14.

Then, an update flag of another user which has been ON is set to OFF (step S22). Specifically, the update flag included in the saved record data for user is set to OFF.

When update flags of a plurality of other users stored in the saved record data for user are ON, processing in steps S16 to S22 is repeated for the users of which update flags are ON.

It is noted that the order of the processing in steps S10 to S14 and the processing in steps S16 to S22 can also be interchanged.

Though the case where record data of another user included in transmission data 205 is used in event processing is described in the present example, the record data is created based on the saved record data for user and record data included in another user's saved record data for user can also be used for performing event processing.

Then, whether or not game processing has been performed a prescribed number of times is determined (step S24). For example, in the present example, the prescribed number of times is set to 5 times.

When it is determined in step S24 that game processing has been performed a prescribed number of times (YES in step S24), the number of times is cleared (step S26). For example, the number of times may return to an initial value 0.

Then, exchange data setting processing for setting the exchange data is performed (step S28). In the present example, processing for setting exchange data in the case where game processing has been performed 5 times is performed by way of example. Details of exchange data setting processing will be described later.

Then, other various types of game processing are performed (step S30). For example, brain training processing for giving questions such as quizzes and puzzles and the like are performed as game processing.

On the other hand, when it is determined in step S24 that game processing has not been performed a prescribed number of times (NO in step S24), steps S26 and S28 are skipped and the process proceeds to step S30. Then, other various types of game processing are performed in step S30.

Then, whether or not the record data has satisfied a prescribed condition is determined (step S32). Specifically, as a prescribed condition, whether or not record data representing a result of training processing which is game processing has surpassed the previous record is determined. For example, elevation of a stage (a level) in the training processing or the like is exemplified.

When it is determined in step S32 that the record data has satisfied the prescribed condition (YES in step S32), exchange data setting processing is performed (step S34). In the present example, by way of example, other than when the game processing has been performed a prescribed number of times, processing for setting exchange data is performed also when the record data has satisfied a prescribed condition. Though details of the exchange data setting processing will be described later, in the exchange data setting processing, comment setting processing in step S50 (see FIG. 10) which will be described later is not performed. It is noted that processing as in step S28 may be performed.

When it is determined in step S32 that the record data has not satisfied the prescribed condition (NO in step S32), step S34 is skipped and whether or not to end the game is determined (step S36). For example, determination can be made based on whether or not the user has indicated end.

When it is determined in step S36 to end the game (YES in step S36), the process ends (end).

On the other hand, when it is determined in step S36 that the game is not to end (NO in step S36), the process returns to step S30 and various other types of game processing are performed. Then the processing above is repeated.

Figure 8:
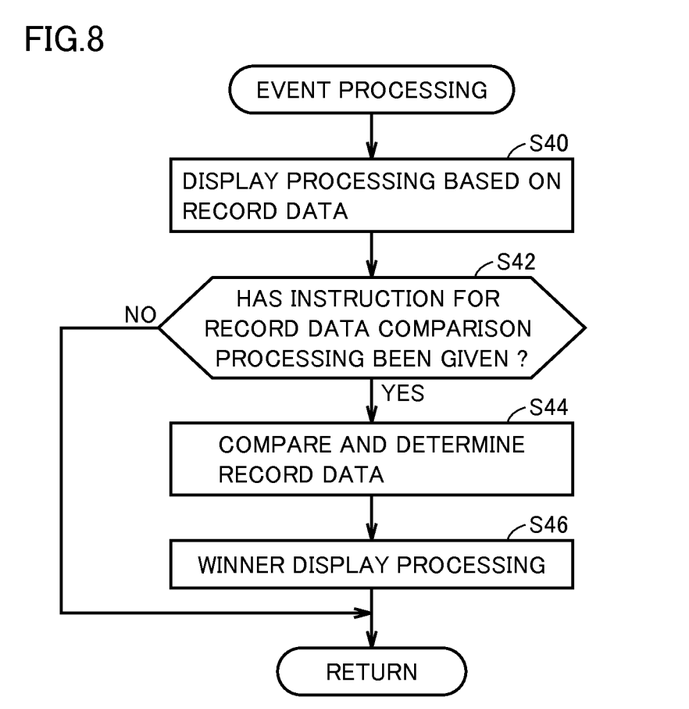
FIG. 8 shows an exemplary illustrative non-limiting flowchart for illustrating event processing according to an exemplary embodiment.

FIG. 8 is a flowchart for illustrating event processing according to the present embodiment.

Figure 9:
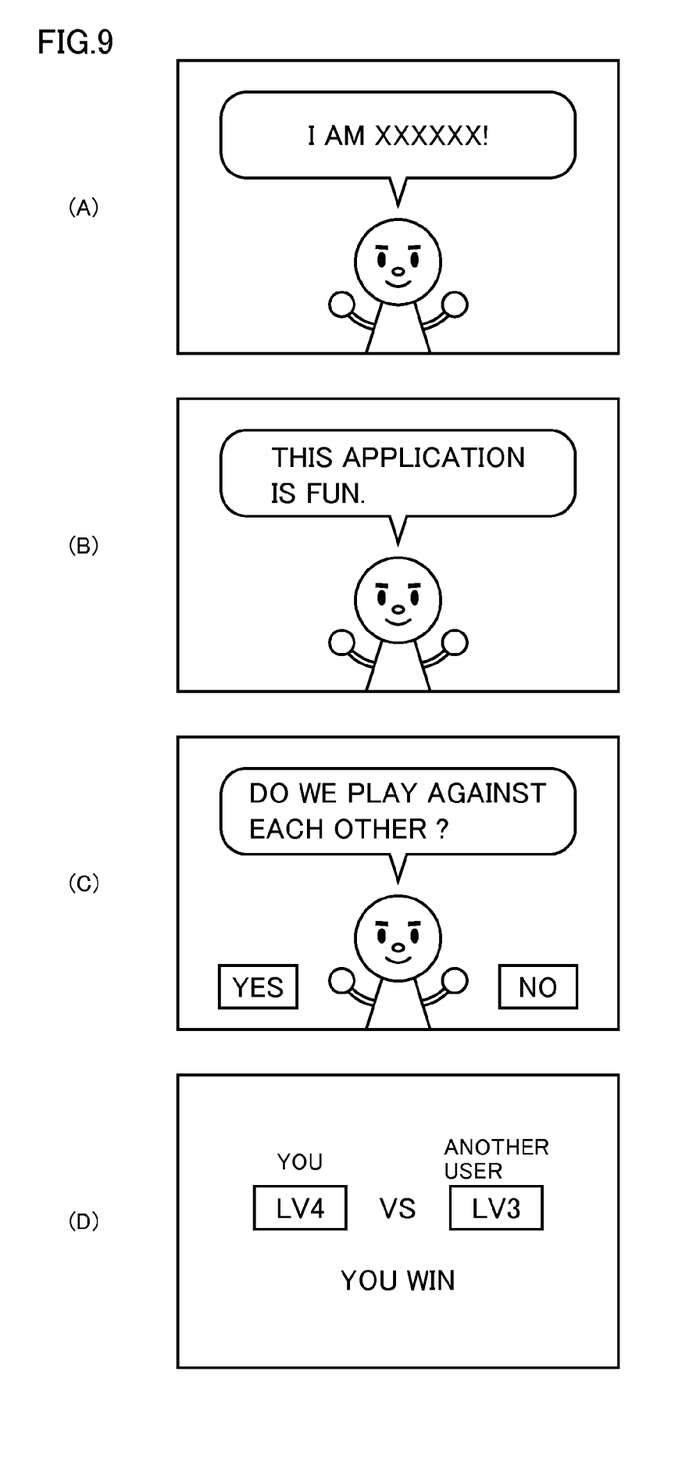
FIG. 9 shows an exemplary illustrative non-limiting diagram for illustrating one example of display processing based on record data according to an exemplary embodiment.

FIG. 9 is a diagram for illustrating one example of display processing based on record data according to the present embodiment.

Referring to FIG. 8, initially, display processing based on the record data is performed (step S40).

Referring to FIG. 9(A), here, for example, based on the record data, a screen for self-introduction of a character by using a user name or the like included in the record data is shown. As the character appears, other users also appear as pseudo users who execute the prescribed application program so that fellow feeling can be enhanced.

Referring to FIG. 9(B), then, for example, based on the record data, a screen displaying comments such as user's feedback on the game included in the record data is shown. By displaying the comments, feedback on the prescribed application program of another user can be viewed so that fellow feeling can be enhanced or satisfaction of the prescribed application program or motivation to play the game can be enhanced.

Referring again to FIG. 8, then, whether or not an instruction for record data comparison processing has been given is determined (step S42).

When it is determined in step S42 that the instruction for record data comparison processing has been given (YES in step S42), record data comparison determination processing is performed (step S44). Then, winner display processing based on the comparison determination processing is performed (step S46).

Then, the process ends (return).

On the other hand, when it is determined in step S42 that no instruction for record data comparison processing was given (NO in step S42), the process ends (return) after skipping steps S44 and S46.

Referring to FIG. 9(C), here, a screen inviting record data comparison processing, that is, inviting play against each other, is displayed. Specifically, a case where selection can be made between "YES" indicating a comparison processing instruction and "NO" indicating refusal of comparison processing in connection with a question "Do we play against each other?" is shown.

For example, when "YES" is selected in response to selection between "YES" and "NO" in connection with the question "Do we play against each other?", winner determination processing based on comparison of data between the record data of the user himself/herself and record data of another user is performed.

Referring to FIG. 9(D), here, a screen for winner display processing based on comparison determination processing is shown.

Specifically, a case where winner is indicated based on comparison between the record data of the user himself/herself and the record data of another user is shown. In the present example, the case where the level in the record data of the user himself/herself is LV4 and the record data of another user is LV3 is shown. Since the record data of the user himself/herself is higher in level than the record data of another user, winning of the user himself/herself (you) is shown.

Owing to processing for playing against another user, motivation to execute a prescribed application program or zest of a game can be enhanced.

Exchange data setting processing will be described next.

Figure 10:
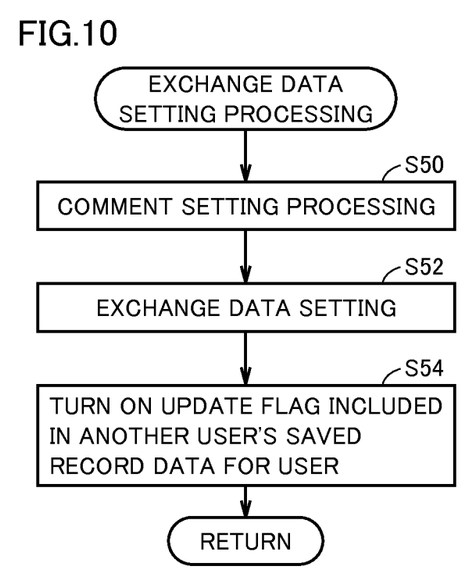
FIG. 10 shows an exemplary illustrative non-limiting flowchart of exchange data setting processing according to an exemplary embodiment.

FIG. 10 is a flowchart of exchange data setting processing according to the present embodiment.

Referring to FIG. 10, initially, comment setting processing is performed (step S50).

Figure 11:
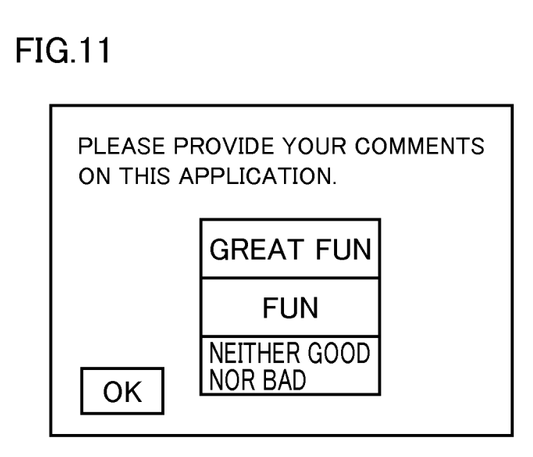
FIG. 11 shows an exemplary illustrative non-limiting diagram for illustrating a screen for comment setting processing according to an exemplary embodiment.

FIG. 11 is a diagram for illustrating a screen for comment setting processing according to the present embodiment.

Referring to FIG. 11, a screen where feedback on a prescribed application program (game) can be set by a user as comments is shown here.

Specifically, a case where any comments among three options of "great fun", "fun", and "neither good nor bad" as feedback on the training processing can be set is shown. Though three options are exemplified by way of example, the example is not particularly limited as such, and two options or a greater number of options may also naturally be provided.

Though a case where option candidates are predetermined by default is described here, the case is not particularly limited as such, and a user may be able to freely provide comments through input. Feedback also includes information that a user would like to tell to another user, such as effects of the training processing.

Contents of the set comments are included in the saved record data for user.

It is noted that a plurality of patterns of comments may be prepared so that patterns of comments are sequentially switched in accordance with the number of times of comment setting processing.

Referring again to FIG. 10, exchange data is set next (step S52).

Specifically, by referring to the saved record data for user, record data and the like that are the set comments above and results of execution of the game are set as the transmission data of the exchange data. It is noted that, if there is previously set data, the previous data can be overwritten.

Then, the update flag included in another user's saved record data for user is set to ON (step S54).

Specifically, the update flag corresponding to the user himself/herself included in another user's saved record data for user is set to ON. For example, when user A executes a prescribed application program to perform exchange data setting processing, the update flag of user A included in the saved record data for user B is set to ON.

When another user (for example, user B) has executed the prescribed application program through the processing, event processing is performed based on the record data of a user (for example, user A) other than another user who makes use of the device, because the update flag of the user other than another user (for example, user A) is set to ON.

Then, the process ends (return).

Thus, in the present embodiment, exchange data setting processing is performed when game processing is performed a prescribed number of times (5 times by way of example) or when record data satisfies a prescribed condition (the previous record being surpassed). Then, by transmitting and receiving record data of the set exchange data to and from another portable game device, event processing using the exchange data obtained from another portable game device can be performed. In addition, when the prescribed condition is satisfied (the update flag of another user is ON), event processing using the exchange data of another user who makes use of the same portable game device can be performed. Namely, when another user has surpassed the previous record, sets comments, or the like and a part of the saved record data for user is internally updated, event processing using the data is performed.

Thus, regardless of whether or not data has been obtained through near field communication for exchange at the time of passing, event processing based on the exchange data of another user (for example, a family member) sharing the device can be performed based on whether or not a prescribed condition is satisfied. Thus, opportunities for event processing increase and zest of an application program can be enhanced.

In addition, in the embodiment above, though a single information processing apparatus (portable game device 10) performs a plurality of processes shown in FIGS. 6 to 8 and 10, in another embodiment, the plurality of processes may be performed by a plurality of information processing apparatuses (for example, portable game device 10 and a server device) in a distributed manner. Moreover, the plurality of processes shown in FIGS. 6 to 8 and 10 may be performed by one computer (processor 13) or by a plurality of computers in a distributed manner. Furthermore, the plurality of processes may partially or entirely be realized by a dedicated circuit.

With regard to processing for near field communication for exchange above, portable game devices 10 present at a short distance from each other may communicate with each other with the following method, in addition to communication via direct connection between portable game devices 10 present at a short distance from each other. For example, it is assumed that portable game device 10 is equipped with GPS. The game device transmits to a prescribed server, position information data obtained by GPS, time and date information data at the time when position information data was obtained, and data for application. The server uses the position information data and the time and date information data transmitted from a plurality of portable game devices to determine and extract portable game device 10 that has come within a prescribed distance during certain time periods. Namely, the server uses position information from each portable game device 10 to determine whether or not portable game devices 10 have passed each other. Then, data for application may be transmitted from the server to each portable game device such that the data for application is exchanged with portable game device 10 determined as having passed.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory computer readable storage medium having stored thereon an information processing program, which, when executed by a computer of an information processing apparatus, causes the computer of the information processing apparatus to perform operations comprising:
    storing for each user, data for application that can be made use of in a prescribed application program executable by a plurality of users;
    transmitting and receiving the stored data for application to and from another unspecified information processing apparatus present within a prescribed range; and
    performing event processing based on at least one of the received data for application and the stored data for application of another user among said plurality of users when one of said plurality of users executes said prescribed application program,
    wherein the data for application of said another user used for said event processing is data internally updated when said another user executes said prescribed application program.

2. The information processing program according to claim 1, wherein said event processing includes first event processing based on the received data for application and second event processing based on the stored data for application of said another user.

3. The information processing program according to claim 2, wherein
    said first event processing and said second event processing are identical event processing.

4. The information processing program according to claim 2, wherein
    said second event processing is performed based on the stored data for application of said another user even when said information processing apparatus has not received the data for application.

5. The information processing program according to claim 2, wherein
    said second event processing is performed when the stored data for application of said another user satisfies a prescribed condition.

6. The information processing program according to claim 5, wherein
    said prescribed condition refers to a case where at least a part of the data for application of said another user that was used when said second event processing was previously performed is updated.

7. The information processing program according to claim 1, wherein
    said prescribed application program is an application program for performing training processing promoting improvement in physical ability.

8. The information processing program according to claim 7, wherein
    said data for application is data representing progress of a user in connection with said training processing.

9. The information processing program according to claim 8, wherein
    said performing event processing includes performing winner determination processing based on comparison between data for application of the user himself/herself and at least one of received said data for application and the data for application of said another user.

10. The information processing program according to claim 1, wherein
    said storing includes storing said data for application in response to a user's input each time the user executes said prescribed application program a prescribed number of times.

11. The information processing program according to claim 1, wherein
    said transmitting includes transmitting the data for application of said plurality of users to said another information processing apparatus in a batch.

12. A method of controlling an information processing apparatus, comprising:
    storing for each user, data for application that can be made use of in a prescribed application program executable by a plurality of users;
    transmitting and receiving the stored data for application to and from another unspecified information processing apparatus present within a prescribed range; and
    performing event processing based on at least one of the received data for application and the stored data for application of another user among said plurality of users when one of said plurality of users executes said prescribed application program,
    wherein the data for application of said another user used for said event processing is data internally updated when said another user executes said prescribed application program.

13. An information processing apparatus, comprising:
    data storage configured to store for each user, data for application that can be made use of in a prescribed application program executable by a plurality of users;
    at least one wireless communication interface configured to transmit and receive the data for application stored in said data storage to and from another unspecified information processing apparatus present within a prescribed range; and
    a processing system comprising at least one processor, the processing system configured to perform event processing based on at least one of the data for application received by said wireless communication interface and the data for application of another user among said plurality of users stored in said data storage when one of said plurality of users executes said prescribed application program, wherein the data for application of said another user used for said event processing is data internally updated when said another user executes said prescribed application program.

14. An information processing system, comprising:

a data storage unit configured to store for each user, data for application that can be made use of in a prescribed application program executable by a plurality of users;

a data communication unit configured to transmit and to receive the data for application stored in said data storage unit to and from another unspecified information processing apparatus present within a prescribed range; and an event processing unit configured to perform event processing based on at least one of the data for application received by said data communication unit and the data for application of another user among said plurality of users stored in said data storage unit when one of said plurality of users executes said prescribed application program, wherein the data for application of said another user used for said event processing is data internally updated when said another user executes said prescribed application program.

15. A non-transitory computer readable storage medium having stored thereon an information processing program, which, when executed by a computer of an information processing apparatus, causes the computer of the information processing apparatus to perform operations comprising:

storing for each user, data for application that can be made use of in a prescribed application program executable by a plurality of users;

transmitting and receiving the stored data for application to and from another unspecified information processing apparatus present within a prescribed range; and performing event processing based on at least one of the received data for application and the stored data for application of another user among said plurality of users when one of said plurality of users executes said prescribed application program, wherein said event processing includes first event processing based on the received data for application and second event processing based on the stored data for application of said another user, and wherein said second event processing is performed based on the stored data for application of said another user even when said information processing apparatus has not received the data for application.

16. A non-transitory computer readable storage medium having stored thereon an information processing program, which, when executed by a computer of an information processing apparatus, causes the computer of the information processing apparatus to perform operations comprising:

storing for each user, data for application that can be made use of in a prescribed application program executable by a plurality of users;

transmitting and receiving the stored data for application to and from another unspecified information processing apparatus present within a prescribed range; and performing event processing based on at least one of the received data for application and the stored data for application of another user among said plurality of users when one of said plurality of users executes said prescribed application program, wherein said event processing includes first event processing based on the received data for application and second event processing based on the stored data for application of said another user, and wherein said second event processing is performed when the stored data for application of said another user satisfies a prescribed condition.

17. A non-transitory computer readable storage medium having stored thereon an information processing program, which, when executed by a computer of an information processing apparatus, causes the computer to perform operations comprising:

storing, in a respective record for each of a plurality of users, application data for use by a prescribed application program executable on the computer by the plurality of users;

receiving application data associated with the prescribed application program executing on another information processing apparatus present within a prescribed range of the information processing apparatus; and when one of the plurality of users executes the prescribed application program on the computer, performing event processing based on at least one of (1) the received application data and (2) the stored application data of another user of said plurality of users, wherein the stored data for application of said another user is data internally updated when said another user executes said prescribed application program.

* * * * *